United States Patent
Cohen et al.

(10) Patent No.: US 10,536,511 B2
(45) Date of Patent: Jan. 14, 2020

(54) FEED MODELING INCORPORATING EXPLICIT FEEDBACK

(71) Applicant: Microsoft Technology Licensing, LLC, Redmond, WA (US)

(72) Inventors: Tomer Cohen, Mountain View, CA (US); Guy Lebanon, Menlo Park, CA (US); Qi He, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 15/379,959

(22) Filed: Dec. 15, 2016

(65) Prior Publication Data

US 2018/0173376 A1    Jun. 21, 2018

(51) Int. Cl.
*G06Q 50/00* (2012.01)
*H04L 29/08* (2006.01)

(52) U.S. Cl.
CPC ............. *H04L 67/10* (2013.01); *G06Q 50/01* (2013.01)

(58) Field of Classification Search
CPC ..................................................... G06Q 50/01
See application file for complete search history.

(56) References Cited

U.S. PATENT DOCUMENTS

| | | | | |
|---|---|---|---|---|
| 8,380,710 B1* | 2/2013 | Finne | ................ | G06F 16/24578 707/723 |
| 2007/0038646 A1* | 2/2007 | Thota | .................... | G06F 16/951 |
| 2011/0246457 A1* | 10/2011 | Dong | ..................... | G06Q 10/06 707/725 |
| 2013/0159885 A1* | 6/2013 | Yerli | ...................... | G06Q 10/10 715/753 |
| 2013/0268597 A1* | 10/2013 | van Hoff | ............. | G06F 16/3322 709/204 |
| 2014/0019261 A1* | 1/2014 | Hegeman | ............... | G06Q 30/02 705/14.71 |
| 2014/0372351 A1* | 12/2014 | Sun | ...................... | G06N 99/005 706/12 |
| 2015/0100415 A1* | 4/2015 | Yu | ...................... | G06Q 30/0251 705/14.49 |
| 2015/0186948 A1* | 7/2015 | Flake | ................. | G06Q 30/0269 705/14.66 |
| 2016/0086219 A1* | 3/2016 | Richardson | ....... | G06F 17/30867 705/14.53 |
| 2016/0224559 A1* | 8/2016 | Hicks | .................... | G06F 16/211 |

(Continued)

*Primary Examiner* — Dino Kujundzic
(74) *Attorney, Agent, or Firm* — Schwegman Lundberg & Woessner, P.A.

(57) ABSTRACT

A machine may be configured to generate a digital content feed based on at least explicit feedback from a member of a Social Networking Service (SNS). For example, the machine generates explicit input data describing digital content preferences of a member of the SNS based on a communication including explicit feedback data. The communication is received from a client device associated with the member. The machine accesses feature data pertaining to one or more items of digital content determined to be relevant to the member. The feature data describes one or more characteristics associated with the one or more items. The machine generates a feed of items of digital content for the member based on the explicit input data and the feature data. The machine causes a presentation of the feed of the items of digital content in a user interface of the client device associated with the user.

20 Claims, 11 Drawing Sheets

(56) References Cited

U.S. PATENT DOCUMENTS

| | | | |
|---|---|---|---|
| 2016/0224560 A1* | 8/2016 | Hartman | G06F 16/211 |
| 2016/0292285 A1* | 10/2016 | Lee | G06F 17/30958 |
| 2016/0321760 A1* | 11/2016 | Hu | G06Q 10/063 |
| 2016/0321761 A1* | 11/2016 | Lytkin | G06Q 50/01 |
| 2017/0171139 A1* | 6/2017 | Marra | H04L 51/32 |
| 2017/0351679 A1* | 12/2017 | Shivaswamy | H04L 51/32 |
| 2017/0353421 A1* | 12/2017 | Lytkin | H04L 51/32 |
| 2018/0027092 A1* | 1/2018 | Foged | H04L 67/327 |

* cited by examiner

FEED MODELING INCORPORATING EXPLICIT FEEDBACK

TECHNICAL FIELD

The present application relates generally to systems, methods, and computer program products for generating a digital content feed based on at least explicit feedback from a member of a Social Networking Service (hereinafter also "SNS").

BACKGROUND

Recently, many online digital content providers have been publishing digital content feeds on their web sites. A digital content feed (also "news feed," "web feed," or "feed") is a data format used for providing users of the web site with frequently updated digital content. Some providers may allow their users to subscribe to feeds, while others may display the feed on client devices of members of an online social network (e.g., in response to receiving login credentials of the members). The digital content included in the feed may include a summary of an article, a link to a webpage, an advertising, etc.

BRIEF DESCRIPTION OF THE DRAWINGS

Some embodiments are illustrated by way of example and not limitation in the figures of the accompanying drawings, in which.

DETAILED DESCRIPTION

Figure 1:
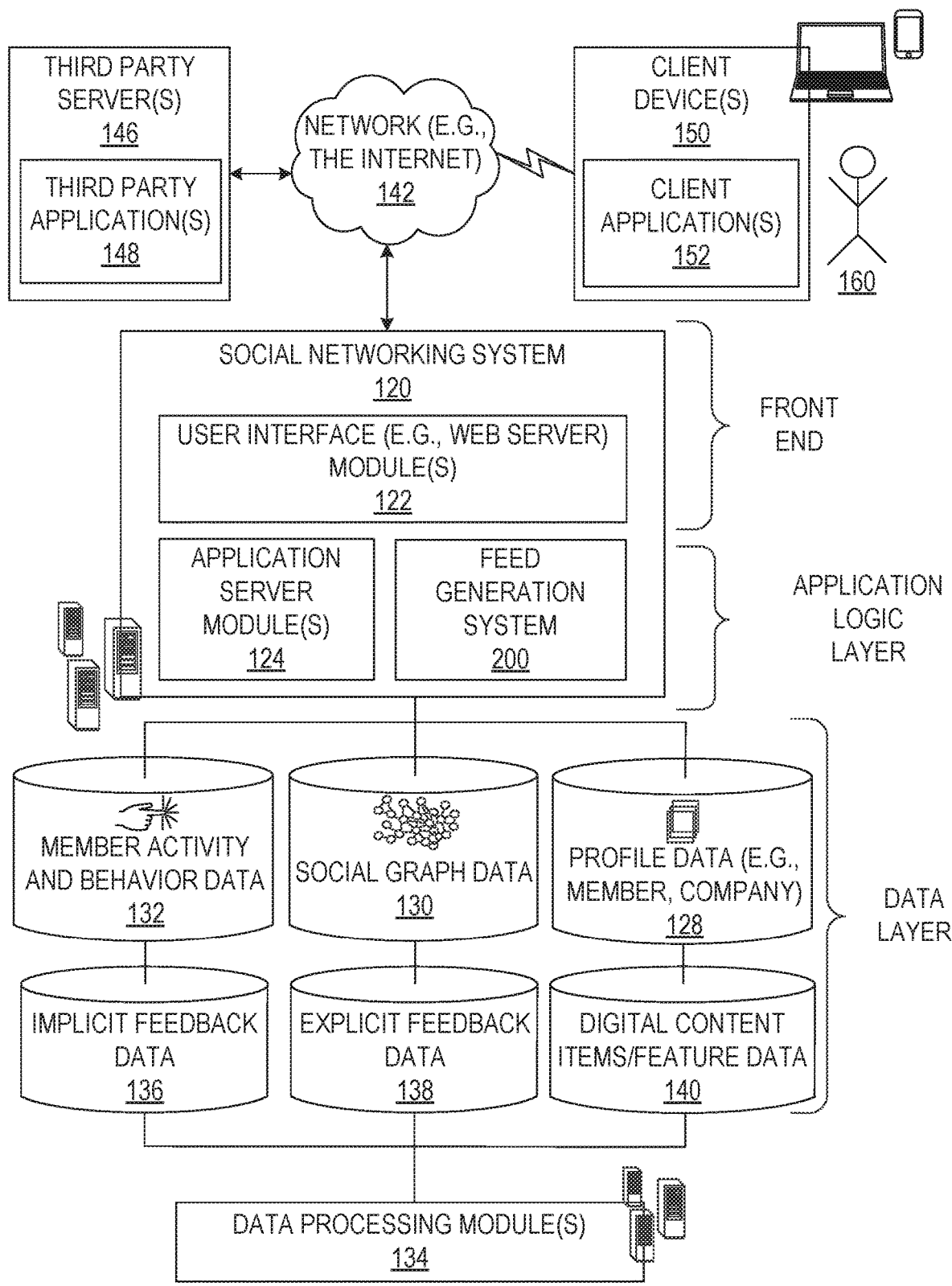
FIG. 1 is a network diagram illustrating a client-server system, according to some example embodiments.

Example methods and systems for generating a digital content feed based on at least explicit feedback from a member of a Social Networking Service (hereinafter also "SNS"), such as LinkedIn®, are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

In some example embodiments, a feed generation system generates a digital content feed that includes items of digital content that are determined, by a machine, to be relevant to a particular member of the SNS. The items of digital content to be included in the feed generated for the particular user are selected and organized in the feed based on explicit feedback data received from the particular member, and based on implicit feedback data derived automatically using various data pertaining to the particular member (e.g., member activity and behavior data). The feed generated for the particular member is customized such that the feed presents a diversity of items of digital content based on the source of the content, the type of the content, or both. A display of a feed that includes items of digital content that are both relevant and diverse, generally, results in a higher interaction rate by the member of the SNS with the presented digital content items.

In some example embodiments, a feed includes items of digital content accessed (e.g., received) from several different sources, also called First Pass Rankers (hereinafter also "FPRs"). Each FPR may perform a first ranking of items of digital content of a particular type based on relevance to a particular member of the SNS. Examples of types of items of digital content are job recommendations, news article recommendations, company mentioned in the news, updates or shares from a member's connections on the SNS (e.g., Shares, Likes, connection updates, job change updates, profile changes, etc.), updates or shares from the people or companies a particular member follows on the SNS, recommendations for new connections (e.g., "People You May Know"), sponsored updates, etc. An FPR may analyze and assign an FPR score value to the available items of digital content of a particular type based on the relevance of the item to a particular member of the SNS. Then, the FPR may perform a first-pass ranking of the items of digital content based on their FPR score values. The FPR may also output the top-k items of digital content of the particular type to a Second Pass Ranker (also "SPR") that combines the output of a plurality of FPRs and creates a single ranked list of items of various types of digital content, wherein the single ranked list is personalized for the particular member. In some example embodiments, the SPR (or the functionality of the SPR) is included in the feed generation system.

Based on combining the output of the FPRs into a single ranked list, the feed generation system may output the single ranked list to a particular front-end. For example, the feed generation system may generate a feed that includes the single ranked list and that is customized for presentation on a particular type of client device (e.g., a mobile device, a desktop device, etc.), a particular browser, or a particular web site environment (e.g., a company feeds page, a Sales Navigator page, etc.). In some instances, the customization is performed based on a particular template.

According to some example embodiments, the feed generation system accesses explicit input data describing digital content preferences of a particular member of the SNS (e.g., from a record of a database). The explicit input data is received from a client device associated with the particular member (e.g., during the on-boarding of the member, or based on previously presented digital content). The explicit input data may include data that originates with a particular member and that reflects (e.g., corresponds to, identifies, describes, indicates, etc.) a relevance of certain content to the particular member, as expressed by the particular member. In some example embodiments, the explicit input data includes member preference of one or more types of digital content. In some instances, the member provides explicit feedback pertaining to a particular item of digital content (or to a type of digital content) to the feed generation system by selecting, in a user interface of a client device, an indicator (e.g., a button, an option, a number on a scale of numbers, etc.) corresponding to a level of interest or relevance of the content to the member.

The feed generation system also accesses feature data pertaining to one or more items of digital content determined to be relevant to the particular member. The feature data describes one or more characteristics associated with the one or more items, or with one or more members of the SNS (e.g., a target member who may receive the item of digital content, or a source member who has authored the information that is the basis of the item of digital content, an updating member, a content sharer, etc.). Examples of such characteristics are whether an updating member is a connection of the particular member (e.g., the receiver of the update) via the SNS, whether the particular member has interacted with the updating member and how much, the age of the item of digital content (e.g., whether the item is fresh or stale), whether there is an image associated with the item of digital content, or how many people liked the share (e.g., the number of clicks, the number of likes, the number of shares, etc.).

The feed generation system then generates a feed of items of digital content for the particular member based on the explicit input data and the feature data. The feed generation system causes a presentation of the feed of the items of digital content in a user interface of the client device associated with the particular user.

In some example embodiments, as part of generating the feed of items of digital content for a particular member of the SNS, the feed generation system utilizes a logistic regression model. The logistic regression model takes as input feature data pertaining to one or more candidate items of digital content (e.g., the one or more items of digital content determined to be relevant to the particular member by the one or more FPRs), feature data pertaining to the particular member (e.g., profile data, social graph data, and/or member activity and behavior data pertaining to the particular member), and the FPR score values associated with the candidate items of digital content, and outputs a feed score value that captures (e.g., specifies, describes, etc.) the probability that the viewer (e.g., the particular member) will click on the particular candidate item of digital content.

The feed generation system then ranks the top candidate items of digital content from the different FPRs based on the feed score values associated with the candidate items. The ranking results in a ranked list of candidate items. The feed generation system may also modify (e.g., re-order) the ranked list of candidate items to ensure diversity and other properties deemed desirable from a product and strategy perspective.

There may be a number of benefits to having a two-stage process of arriving at a single ranked list of candidate items for a feed, wherein, at the first stage, multiple sources of digital content items each utilize their own FPR to rank relevant digital content items of particular types, and, at the second stage, the feed generation system aggregates a feed of items of digital content of various types accessed (e.g., received) from the multiple sources. One benefit is scalability. The sources of digital content use a sophisticated index to store large numbers of items of digital content for fast retrieval. The two-stage process allows each FPR, at the first stage, to identify and retrieve the top-k items of digital content of a particular type very fast. The feed generation system (e.g., a SPR aggregator included in the feed generation system), at the second stage, also exhibits higher processing speeds based on scoring only a relatively small number of candidate items of digital content.

According to some example embodiments, one or more of the methodologies discussed herein may obviate a need for additional processing of data (e.g., the analysis of features pertaining to items of digital content, the analysis of features pertaining to members of the SNS, etc.), which may have the technical effect of reducing computing resources used by one or more devices within the feed generation system, or within systems or databases associated with the feed generation system (e.g., the FPRs). Examples of such computing resources include, without limitation, processor cycles, network traffic, memory usage, storage space, and power consumption.

An example method and system for generating a digital content feed based on at least explicit feedback from a member of the SNS may be implemented in the context of the client-server system illustrated in FIG. 1. As illustrated in FIG. 1, the feed generation system 200 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online ad consumption event associated with the member (e.g., an online ad viewed by the member), the date and time when the online ad event took place, an identifier of the creative associated with the online ad consumption event, a campaign identifier of an ad campaign associated with the identifier of the creative, etc.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include the data migration system 200, which is described in more detail below.

Further, as shown in FIG. 1, a data processing module 134 may be used with a variety of applications, services, and features of the social networking system 120. The data processing module 134 may periodically access one or more of the databases 128, 130, 132, 136, 138, or 140, process (e.g., execute batch process jobs to analyze or mine) profile data, social graph data, member activity and behavior data, implicit feedback data, explicit feedback data, or digital content items or digital content feature data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
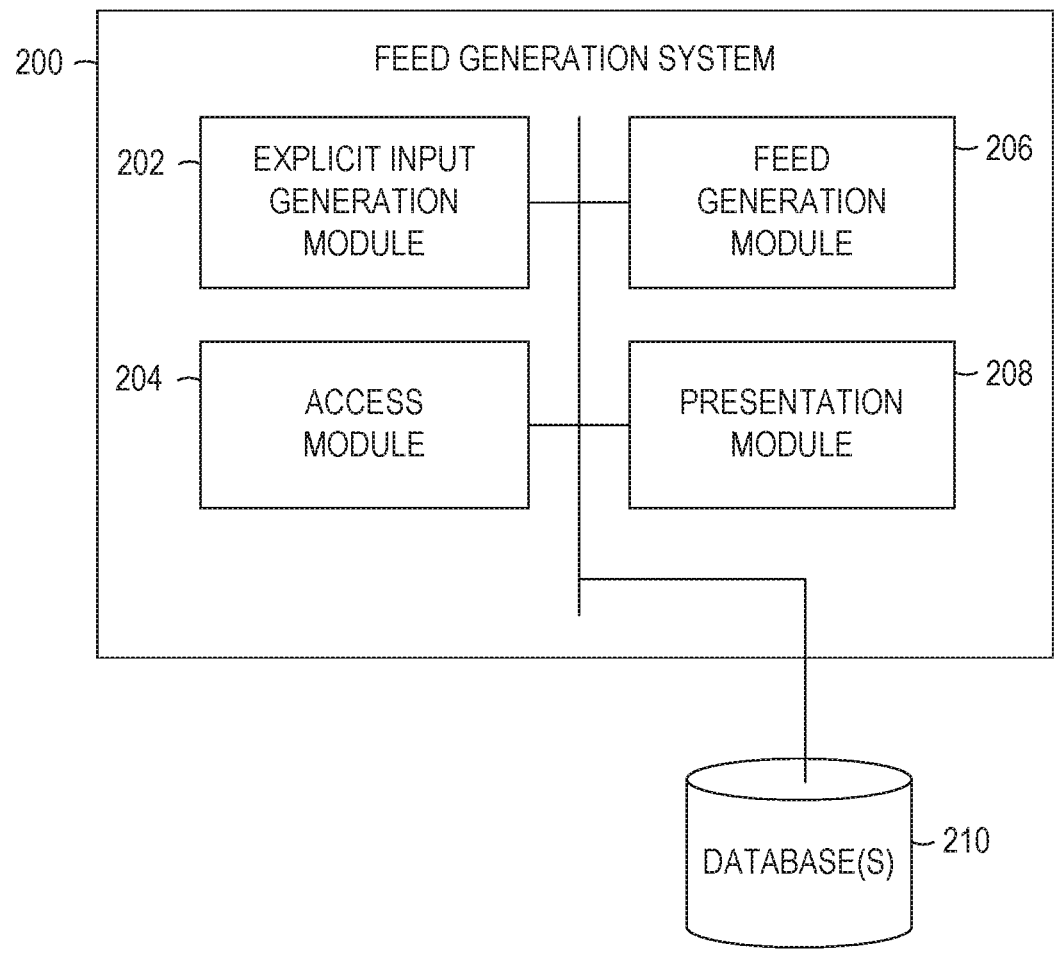
FIG. 2 is a block diagram illustrating components of a feed generation system, according to some example embodiments.

FIG. 2 is a block diagram illustrating components of the feed generation system 200, according to some example embodiments. As shown in FIG. 2, the feed generation system 200 includes an explicit input generation module 202, an access module 204, a feed generation module 206, and a presentation module 208, all configured to communicate with each other (e.g., via a bus, shared memory, or a switch).

According to some example embodiments, the explicit input generation module 202 generates explicit input data describing digital content preferences of a particular member of a social networking service (SNS). The generating of the explicit input data may be based on a communication including explicit feedback data provided by the particular member to the feed generating system 200 via a user interface of a client device associated with the particular member. The communication (e.g., message, signal, notification, etc.) may be received from the client device associated with the particular member. The explicit input generation module 202 may store the explicit input data describing digital content preferences of the particular member in a record of a database (e.g., database 210) in association with an identifier of the particular member (e.g., a member ID).

In some example embodiments, the explicit feedback data includes data pertaining to one or more online actions by the particular member at a member on-boarding time. For example, at the time a user registers as a member of the SNS (e.g., at on-boarding time), the user selects (e.g., clicks on) one or more options that specify one or more types of digital content that the user is interested in receiving in the feed provided by the SNS. The user may make the selection of the one or more options via a user interface of a client device associated with the user.

In various example embodiments, the explicit feedback data includes data pertaining to one or more online actions by the particular member towards digital content previously displayed to the particular member. For example, when presented with certain items of digital content by the SNS in a feed or via other channels in a user interface, the member may select (e.g., click on) a button that is associated with a particular item of digital content and that states "Show more like this" or, alternately, "Show less like this." The one or more actions may indicate an intent by the particular member to curate the feed generated for the particular member.

The access module 204 accesses the explicit input data associated with the particular member from a record of a database (e.g., database 210) based on an identifier of the particular member. The access module 204 also accesses feature data pertaining to one or more items of digital content determined to be relevant to the particular member at a record of a database (e.g., database 140) associated with the feed generation system 200. The feature data describes one or more characteristics associated with the one or more items of digital content.

In some example embodiments, an item of digital content may include an informational update pertaining to one or more other members of the SNS. Examples of informational updates pertaining to a member of the SNS are information regarding the member changing jobs, updating skills, connecting to other members, joining groups, etc. In various example embodiments, the items of digital content include update items (e.g., digital content items of an "update" type) from other members of the SNS. Examples of update items from another member of the SNS are a comments by the other member, a reference to an article, etc.

The feed generation module 206 generates a feed of items of digital content for the particular member based on the explicit input data and the feature data. In some example embodiments, the feed includes a minimum gap between two consecutive update items of a particular (e.g., same, or a first) type. For example, a first type of update item pertains to members changing jobs.

In some instances, the minimum gap includes one or more update items of a further (e.g., second) type. For example, the minimum gap includes a connection (e.g., a second type of) update, and a group joining (e.g., a third type of) update.

In certain example embodiments, the minimum gap includes one or more non-update items of digital content. For example, the minimum gap includes an advertising item.

The presentation module 208 causes a presentation of the feed of the items of digital content in a user interface of the client device associated with the particular user.

To perform one or more of its functionalities, the feed generation system 200 may communicate with one or more other systems. For example, an integration system may integrate the feed generation system 200 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 210 (e.g., database 128, 130, 132, 136, 138, or 140).

Figure 3:
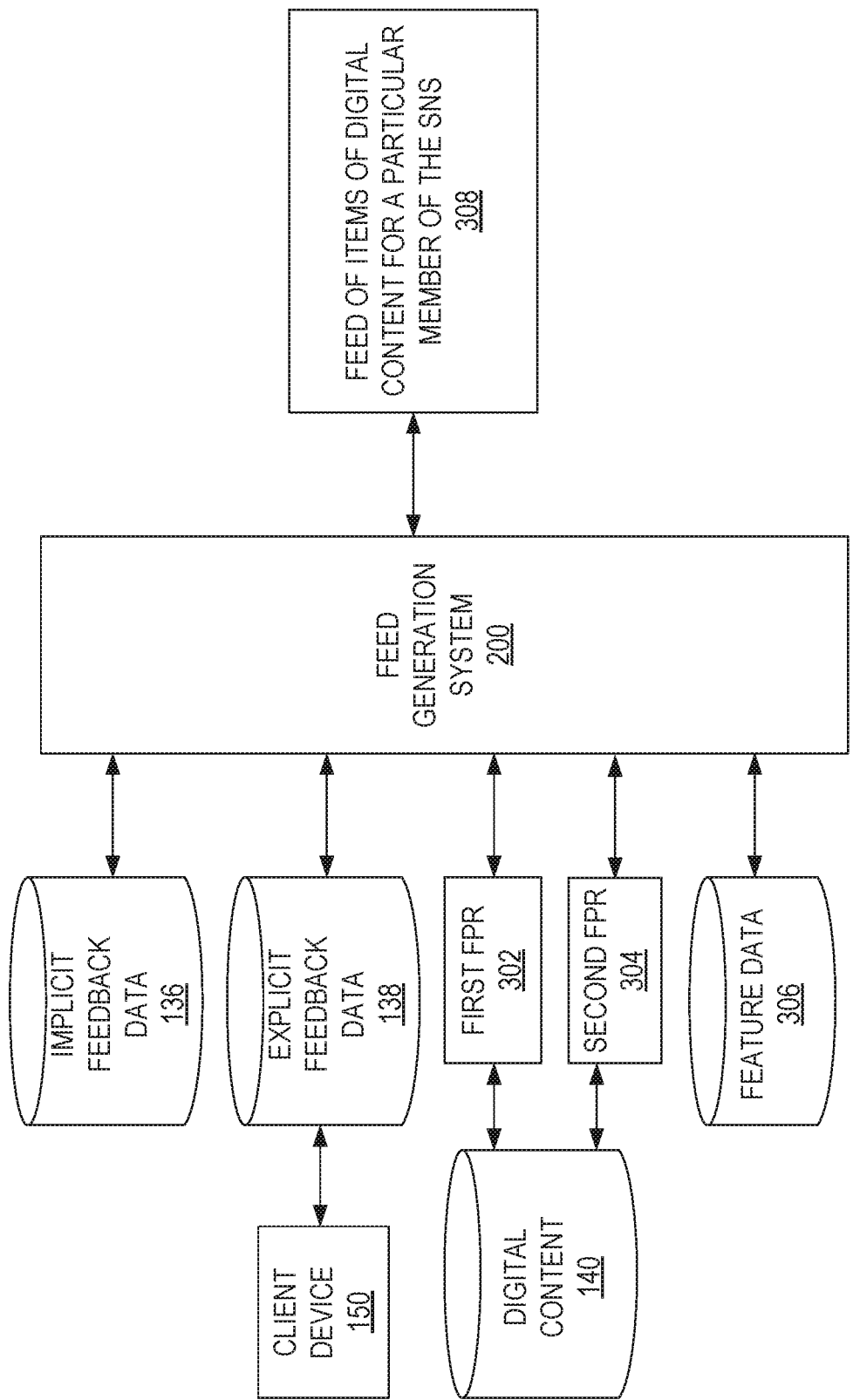
FIG. 3 is a functional representation of an example feed generation system, according to some example embodiments.

FIG. 3 is a functional representation of an example feed generation system, according to some example embodiments. As shown in FIG. 3, the feed generation system 200 may generate a feed 308 of items of digital content for a particular member of the SNS. In some instances, given a member of the SNS, the feed generation system 200 causes the display of the feed 308 that includes activities that happened in the professional network of the member, such as activities done by the member's connections (e.g., other members of the SNS connected to the member via the SNS), activities done by the companies of the influencers followed by the member, and the news articles that the member would be interested in. The feed generation system 200 may provide, for each member of the SNS, an activity stream personalized for the member based on one or more relevance models.

In some example embodiments, the feed generation system 200 accesses (e.g., receives) feature data 306, explicit feedback data 138, and one or more rankings of items of digital content generated by one or more FPRs (e.g., the first FPR 302, the second FPR 304, etc.). In certain example embodiments, the feed generation system 200 also accesses implied feedback data 136. Each FPR accesses a certain type of items of digital content from the digital content database 140, determines (e.g., predicts) an interaction rate value associated with a particular item of digital content, and ranks a plurality of items of digital content of the certain type based on the interaction rate value. In certain example embodiments, the interaction rate value associated with a particular item of digital content is a probability that a particular member of the SNS will select (e.g., click on) the particular item of digital content.

Based on the accessed feature data 306, explicit feedback data 138, and one or more rankings of the items of digital content generated by the one or more FPRs (e.g., the first FPR 302, the second FPR 304, etc.), the feed generation system 200 generates the feed 308. In some example embodiments, feed generation system 200 further generates the feed 308 based on the implicit feedback data 136.

In some example embodiments, the implicit feedback data 136 includes data that is inferred from member behavior on the SNS (e.g., during a visit of the member to a web site associated with the SNS, receiving digital content in an Inbox, etc.) to determine the types of digital content that the member finds relevant without the member explicitly communicating to the feed generation system 200 that a particular item of content is relevant to the member. The feed generation system 200 may track various actions by the member who is presented with online digital content on the SNS, and may determine the types of items of digital content the member selects to view or does not select to view, the time spent viewing an item of digital content, page scrolling (e.g., browsing) actions, providing viral actions such as likes, shares, subscribes, etc. These signals corresponding to a particular member may serve as the basis for generating the implicit feedback data 136 that is associated with the particular member and that indicates a relevance (or interest) to the particular member at a particular time.

The feed 308 is generated in such a manner that the total feed interaction rate value associated with the particular member is maximized. Whether the total feed interaction rate value is maximized may be measured by a number of feed metrics: interactions (e.g., the sum of clicks, likes, comments, follows, joins, connects, re-shares, or saves divided by the number of members), viral actions (e.g., the sum of likes, comments, or re-shares minus the sum of unlikes, divided by the number of members), shares (e.g., the sum of re-shares divided by the number of members), or feed sessions (e.g., the number of sessions in which the user either scrolled down the feed to view at least a certain minimum number of updates, or interacted with a feed item).

The model training problem for the one or more FPRs (e.g., the first FPR 302, the second FPR 304, etc.) becomes that of predicting the interaction rate of a particular viewer (e.g., member) on a particular update (e.g., item of digital content):

$P(\text{interaction}=\text{yes}|\text{viewer,update})$.

To predict the response, the interaction of member i on update t may be abbreviated by the binary variable $y_{it}$ (e.g., "1" if there is an interaction and "−1" otherwise). The modeling assumption is that $y_{it}$ follows a logistic regression model (conditional on the viewer and update). Specifically, assuming that β is a vector of parameters capturing the model and $X_{it}$ is a vector of features characterizing the viewer, the update, and the context, the logistic regression model is $$\log \frac{P(y_{it} = 1 \mid \text{viewer, update})}{1 - P(y_{it} - 1 \mid \text{viewer, update})} = \sum_j \beta_j [X_{it}]_j,$$

-continued which is equivalent to $$P(y_{it} = 1 \mid \text{viewer, update}) = \left(1 + \exp\left(-\sum_j \beta_j [X_{it}]_j\right)\right)^{-1}.$$

Since the model is parameterized by the parameter vector β, it can be learned during the training stage by maximizing the likelihood of the training data.

Training data may be collected for some fixed time period from a random bucket (e.g., a set of users that receive feed updates that are a random shuffle of the top-k updates as ranked by the SPR). The data gathered from the random bucket interaction may feature a tradeoff of explore-exploit. The exploitation may correspond to using updates that are ranked in the top-k positions. The exploration may correspond to the random shuffle of the top-k positions.

Specifically, in some instances, response variables $y_{it}$ may be collected for all users and all updates, together with the associated feature vectors $X_{it}$. The activities with which a viewer interacted with ($y_{it}$=1) are considered positive examples and those with which the viewer did not interact are treated as negative examples.

In various example embodiments, to collect high quality training data, the FPRs and the feed generating system 200 keep track of what updates the viewer saw and did not interact with. For example, the front end may serve a feed of items of digital content to the browser or mobile client, but a particular item was not impressed upon the user (e.g., the user did not scroll down to see all the updates).

In some example embodiments, the parameter vector β is selected by maximizing the likelihood of the training data:

$$L(\beta) = \prod_{i,t} \left(1 + \exp\left(-\sum_j \beta_j [X_{it}]_j\right)\right)^{-1}.$$

The maximization may be done as follows:
1. Form the log likelihood function that is the log of the likelihood function above. The maximizer of the log likelihood is also the maximizer of the likelihood function.
2. Add a regularization term (e.g., Euclidean norm on the parameter vector) to the log likelihood function that penalizes very high or very low parameter values. Doing so may mitigate the negative effect of overfitting. The resulting function after some algebraic manipulation and using vector notation for the parameter vector β and the feature vector Xik is:

$$l(\beta) = -\sum_{ik} \log(1 + \exp(-y_{ik}\beta' X_{ik})) - \frac{1}{2}\lambda \|\beta\|^2$$

3. Compute the gradient of the regularized log likelihood function.
4. Perform gradient-based maximization.

In some example embodiments, maximizing the regularized log likelihood function, as a function of β, can be expressed mathematically as:

$$\operatorname{argmax}_\beta - \sum_{ik} \log(1 + \exp(-y_{ik}\beta' X_{ik})) - \frac{1}{2}(\beta - \mu)'\Sigma^{-1}(\beta - \mu).$$

In the case of the feed, we assume $$\Sigma^{-1} = \lambda I,$$

resulting in L2 regularization over the parameter vector (sum of squares)

$$\operatorname{argmax}_\beta - \sum_{ik} \log(1 + \exp(-y_{ik}\beta' X_{ik})) - \frac{1}{2}\lambda \|\beta\|^2.$$

In various example embodiments, the training procedure is Alternating Direction Method of Multipliers (ADMM). ADMM partitions the data and learns a local model from each partition, and then aggregates all models from partitions and sends back the aggregation results to individual partitions. In some example embodiments, if the number of negative (no interaction) examples is very large, the negative examples are downsampled when the system creates the training set. To maintain the correct prediction probability scale, the system assigns a weight wk (inverse of sampling rate) to negative examples:

$$\operatorname{argmax}_\beta - \sum_{ik} w_{ik} \log(1 + \exp(-y_{ik}\beta' X_{ik})) - \frac{1}{2}\lambda \|\beta\|^2.$$

Feed activities are typically represented as triplets (actor j, verb v, object o). For example, member (actor) shared (verb) update (object), or member (actor) updated (verb) profile. The activity type is a triple of (actor type, verb type, object type). The following table shows a taxonomy of different triplets.

TABLE 1

A taxonomy of (actor, verb, object) triplets.

| Category | Actor Type | Verb Type | Object Type |
| --- | --- | --- | --- |
| Connection | member | connect or follow | member or company |
|  | member | join | group |
| Informational | member or company | share | article, picture, message, discussion, group, job |
| Profile | member | profile-update | picture, address, phone, snapshot, job-change |
| Opinion | member | like or comment | article, picture, message, discussion, group, job |
| Site-Specific | member | anniversary | job-anniversary |
|  | member | endorse or endorse-by | member |
|  | member | recommend or recommend-by | member |

In some cases there are nested activities, for example actor 1 shares an update and actor 2 shares the update of actor 1. In this case, the object of the second activity is the first activity, but the root object of the second activity is the object of the first activity.

Taxonomy of Features

In some example embodiments, features in the feature vector Xit are classified into the following categories:
1. viewer-only features Xi: for example, features capturing viewer profile;
2. activity-only features Xt: features capturing activity type, actor type, verb type, update created time, activity impression time, FPR identity, FPR score, feed position;
3. viewer-actor features Xij: features capturing interaction between viewer and actor;

4. viewer-activity type features Xik: features capturing interaction between viewer and activity type;
5. viewer-actor-activity type features Xijk, features capturing interaction between viewer, actor, and activity type;
6. viewer-object features Xio: features capturing interaction between viewer and the object.

Since the logistic regression model features a linear combination of features, the inner product may be written in a decomposed form:

$$\beta'X_{it} = \beta_i'X_i + \beta_t'X_t + \mu_{ik}'X_{ik} + \beta_{ij}'X_{ij} + \beta_{ijk}'X_{ijk} + \beta_{io}'X_{io}.$$

In some example embodiments, some features are transformed through a nonlinear transformation, and then the transformed features are linearly combined. This allows building models that capture complex non-linear dependencies between the features and the response using the simple logistic regression model and computational tool. Examples of feature transformations are:
1. log function on raw counts,
2. indicator function on raw counts,
3. bucketizing a numerical feature as a set of categorical features,
4. linear spline interpolation to fit a set of piecewise linear functions from data,
5. non-linear function of multiple features (e.g., product), or
6. additional user-defined math functions on raw counts.

In some example embodiments, one or more of the FPRs use decision tree models.

The models used by the one or more FPRs (e.g., the first FPR 302, the second FPR 304, etc.) are automatically trained with new data. The automatic training of the models may happen periodically (e.g., daily, hourly, weekly, etc.) or on-demand.

In some example embodiments, the First FPR 302 and the Second FPR 304 predict interaction rate values for each item of digital content of a particular type, and subsequently rank the items of digital content based on their interaction rate values. To enhance feed metrics that measure user experience on the feed, the feed generation system 200 generates the feed 308 that meets certain feed composition criteria, such as diversity of content and impression discounting.

To generate the feed 308, the feed generation system 200 takes as input the rankings generated by the First FPR 302 and the Second FPR 304, feature data 306, and explicit feedback data accessed from the explicit feedback database 138. In some instances, the feed generation system 200 also takes as input implicit feedback data accessed from the implicit feedback database 136.

The explicit feedback data is provided by the particular member via a user interface of the client device 150. In some instances, the member provides the explicit feedback data at the time the member is on-boarded at the SNS (e.g., when the member registers to become a member of the SNS). Alternatively or additionally, the member provides the explicit feedback data after on-boarding, in response to interacting with an item of digital content by, for example, selecting a button associated with the item that states "Show me more content like this" (or "Show me less content like this").

In some example embodiments, the score values determined by the FPRs for various items of digital content are not calibrated. The feed generation system 200 may score the items accessed from the FPR, in a calibrated way. For each item of digital content, the feed generation system 200 determines a feed score value based on a logistical regression model that takes as input a plurality (e.g., tens, hundreds, or thousands) of feature score values that correspond to features associated with the particular item or with one or more members of the SNS (e.g., whether the target member is a connection of the sharer of the update; whether the target member has interacted with the sharer and how much; the age of the update (e.g., a fresh update has a higher score, and a stale update has a lower score); whether there is an image associated with the update; or how many people liked the share (e.g., number of clicks, number of likes, etc.), etc.), explicit feedback data, implicit feedback data, or a suitable combination thereof.

The feed score value, in some example embodiments, is equal to a sum of products, such as $(\alpha_1\theta_1f_1 + \alpha_2\theta_2f_2 + \ldots + \alpha_k\theta_kf_k)$, where the $\alpha$s are parameters (e.g., weights, or coefficients) that correspond to levels of interest explicitly expressed by the particular member for various types of digital content, the $\theta$s are parameters (e.g., weights, or coefficients) identified based on historic data collected for the entire membership (e.g., from implicit feedback) using machine learning and that are given to particular features, and where $f_1, f_2, \ldots f_k$ are feature score values.

For example, $f_1$ corresponds to a feature called "share from network," and the value of $f_1$ is either "1" or "0." The value of $f_1$ is "1" if the item of digital content is a "share from network." The value of $f_1$ is "0" if the item of digital content is not a "share from network," but a different type of item of digital content. The values of the $\alpha_1$ and $\theta_1$ parameters indicate how much the particular member cares about seeing "shares from network," as expressly indicated by the member or implicitly determined by the feed generation system 200, respectively. Various members may have various levels of interest for various types of items of digital content.

In some example embodiments, the feed generation system 200 (or another system) collects explicit feedback data 138 from the particular member via a user interface of the client device 150. The feed generation system 200 may cause a display of a number of questions in the user interface on the client device 150 at the time the member is on-boarded. Examples of such questions are "Are you interested in shares from network?" and "Do you want to see them at the top of the feed?" If the member specifies that they do not want to see a particular type of digital content, the $\alpha$ parameter associated with that type of content may be set to "0" for a limited period of time. Alternately, the $\alpha$ parameter (e.g., the explicit feedback coefficient) may be divided by a large number to minimize the frequency of appearance of such an item of content. If the member is very interested in a particular type of content, the explicit feedback coefficient may be given a higher weight value. The explicit feedback coefficient may change in the future based on receiving additional explicit feedback from the member with regard to a particular type of content (e.g., the member selects a "Show me more like this" button). In some example embodiments, if the member stops providing explicit feedback data, the explicit feedback coefficients slowly revert back to "1," where "1" represents a neutral opinion of the type of content by the member.

The feed generation system 200 may then re-rank the items of digital content based on their feed score values. The re-ranking may result in a candidate feed whose items of digital content, in some example embodiments, are ordered into a final feed (e.g., feed 308) such that the feed is diverse. A diverse feed is a feed which does not present a plurality of items of a particular type or from a particular source too close together. Generally, diverse feeds are more desirable because they encourage more interactions by the members with the digital content items in the feeds. In some instances, ordering the items of digital content of a particular type (or from a particular source) with a minimum gap between them that is filled by items of a different type (or from a different source) may provide more feed diversity.

Figure 4:
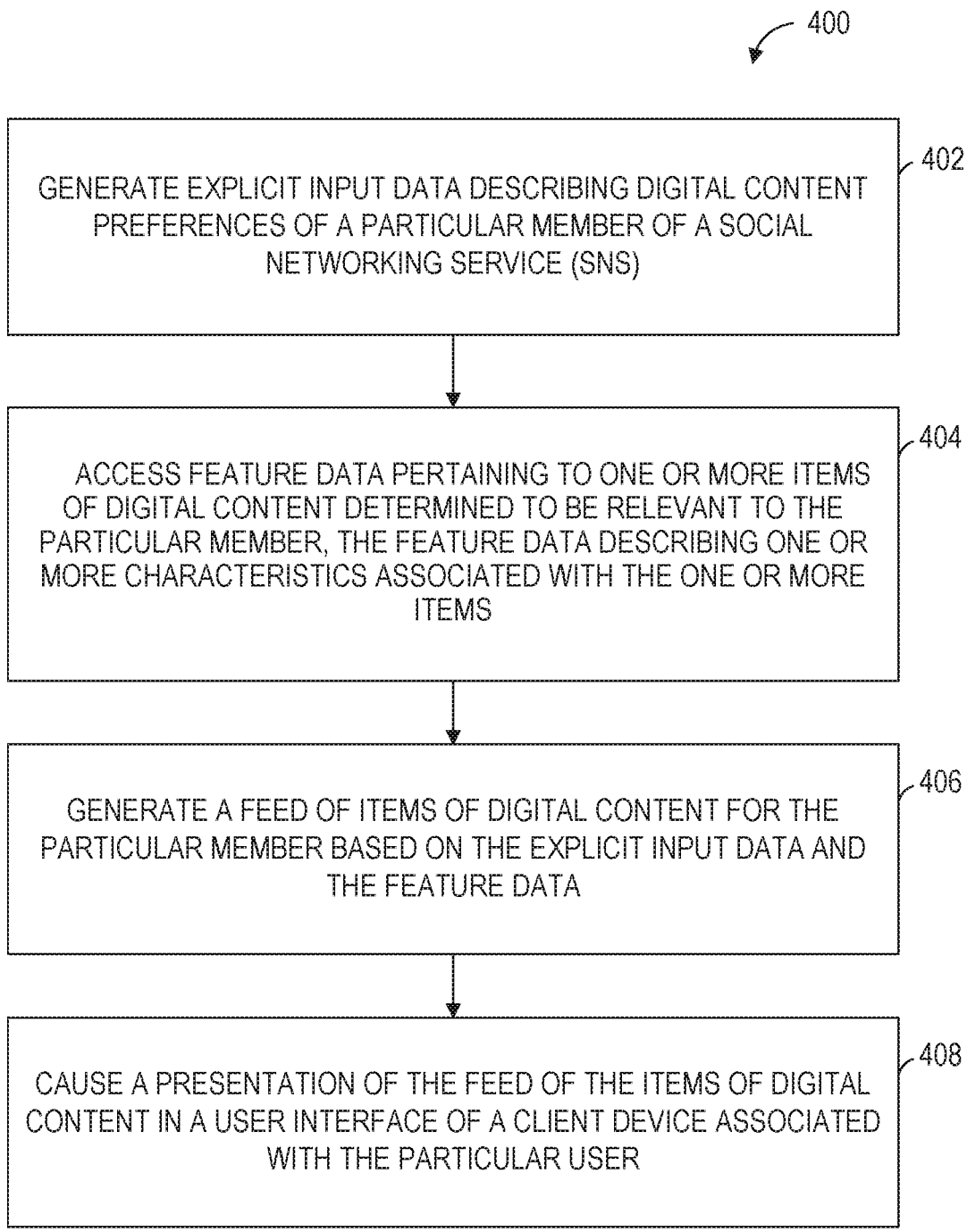
FIG. 4 is a flowchart illustrating a method for generating a digital content feed based on at least explicit feedback from a member of the SNS, according to some example embodiments.

FIGS. 4-9 are flowcharts illustrating a method for generating a digital content feed based on at least explicit feedback from a member of the SNS, according to some example embodiments. Operations in the method 400 illustrated in FIG. 4 may be performed using modules described above with respect to FIG. 2. As shown in FIG. 4, method 400 may include one or more of method operations 402, 404, 406, and 408, according to some example embodiments.

At operation 402, the explicit input generation module 202 generates explicit input data describing digital content preferences of a particular member of the SNS. The generating of the explicit input data may be based on a communication including explicit feedback data provided by the particular member to the feed generating system 200 via a user interface of a client device associated with the particular member. The communication (e.g., message, signal, notification, etc.) may be received from the client device associated with the particular member.

In some example embodiments, the explicit input data describing digital content preferences of the particular member includes data pertaining to one or more online actions by the particular member at a member on-boarding time. According to some example embodiments, the explicit input data includes data describing member preference of one or more types of digital content.

In various example embodiments, the explicit input data describing digital content preferences of the particular member includes data pertaining to one or more online actions by the particular member towards digital content previously displayed to the particular member. In some instances, the one or more online actions may indicate requests to receive more digital content similar to the digital content previously displayed to the particular member. In some instances, the one or more online actions may indicate requests to receive less digital content similar to the digital content previously displayed to the particular member. The one or more actions may indicate an intent by the particular member to curate the feed generated for the particular member.

At operation 404, the access module 204 accesses feature data pertaining to one or more items of digital content determined to be relevant to the particular member. The feature data describes one or more characteristics associated with the one or more items or with one or more members of the SNS (e.g., the target member, the source member, etc.). In some example embodiments, an item of digital content may include an informational update pertaining to one or more other members of the SNS (e.g., an update indicating that another member has changed jobs or has updated a portion of the member profile).

At operation 406, the feed generation module 206 generates a feed of items of digital content for the particular member based on the explicit input data and the feature data.

At operation 408, the presentation module 208 causes a presentation of the feed of the items of digital content in a user interface of the client device associated with the particular user.

Further details with respect to the method operations of the method 400 are described below with respect to FIGS. 5-9.

Figure 5:
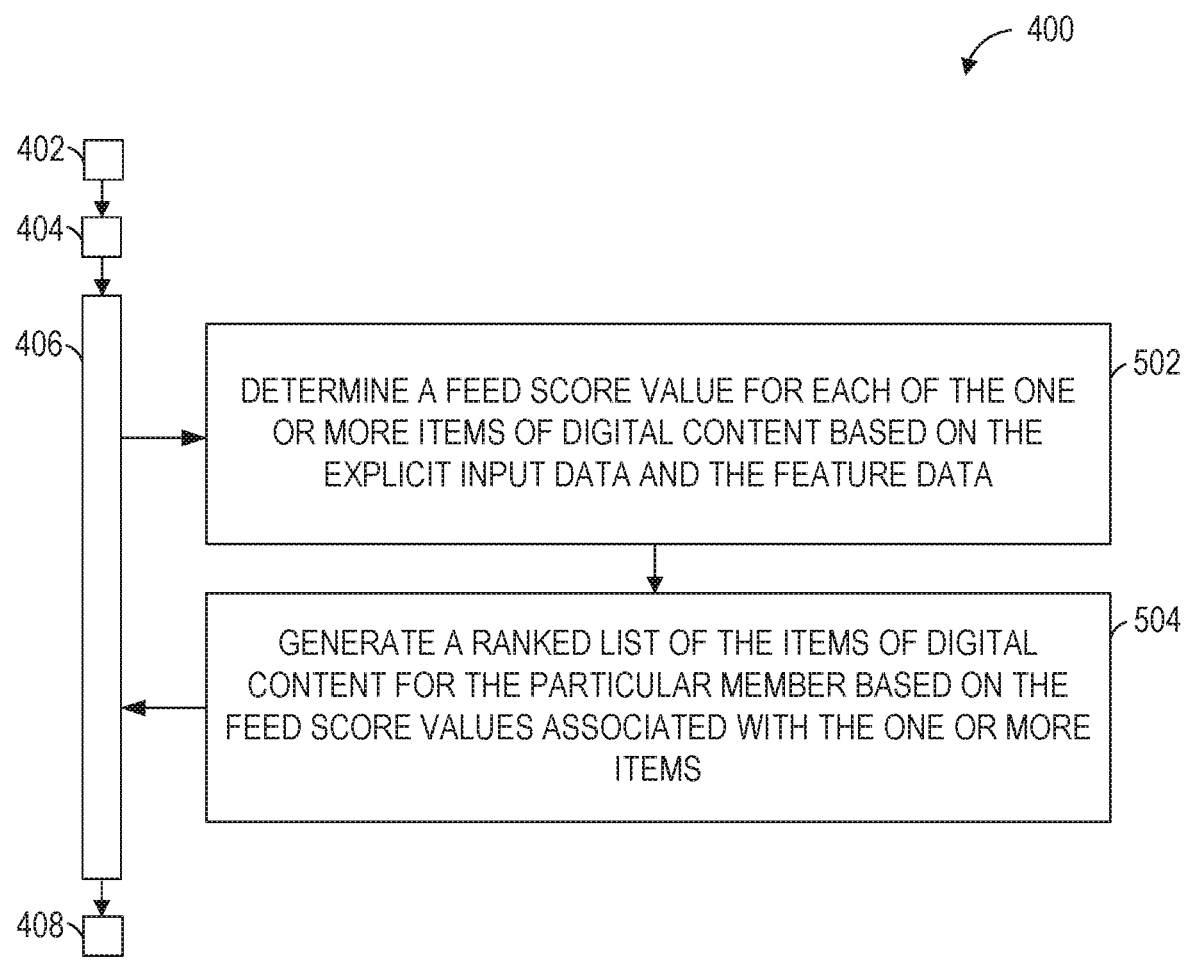
FIG. 5 is a flowchart illustrating a method for generating a digital content feed based on at least explicit feedback from a member of the SNS, and representing step 406 of the method illustrated in FIG. 4 in more detail, according to some example embodiments.

As shown in FIG. 5, the method 400 may include one or more method operations 502 or 504, according to some example embodiments. Operation 502 may be performed as part (e.g., a precursor task, a subroutine, or a portion) of operation 406 of FIG. 4, in which the feed generation module 206 generates a feed of items of digital content for the particular member based on the explicit input data and the feature data.

At operation 502, the feed generation module 206 determines a feed score value for each of the one or more items of digital content based on the explicit input data and the feature data. In some example embodiments, the feed score value associated with a particular item of digital content is a probability value that indicates a likelihood that the particular member selects the particular item of digital content.

Operation 504 may be performed after operation 502. At operation 504, the feed generation module 206 generates a ranked list of the items of digital content for the particular member based on the feed score values associated with the one or more items. The generating of the feed of items of digital content for the particular member is further based on the ranked list of the items of digital content for the particular member.

Figure 6:
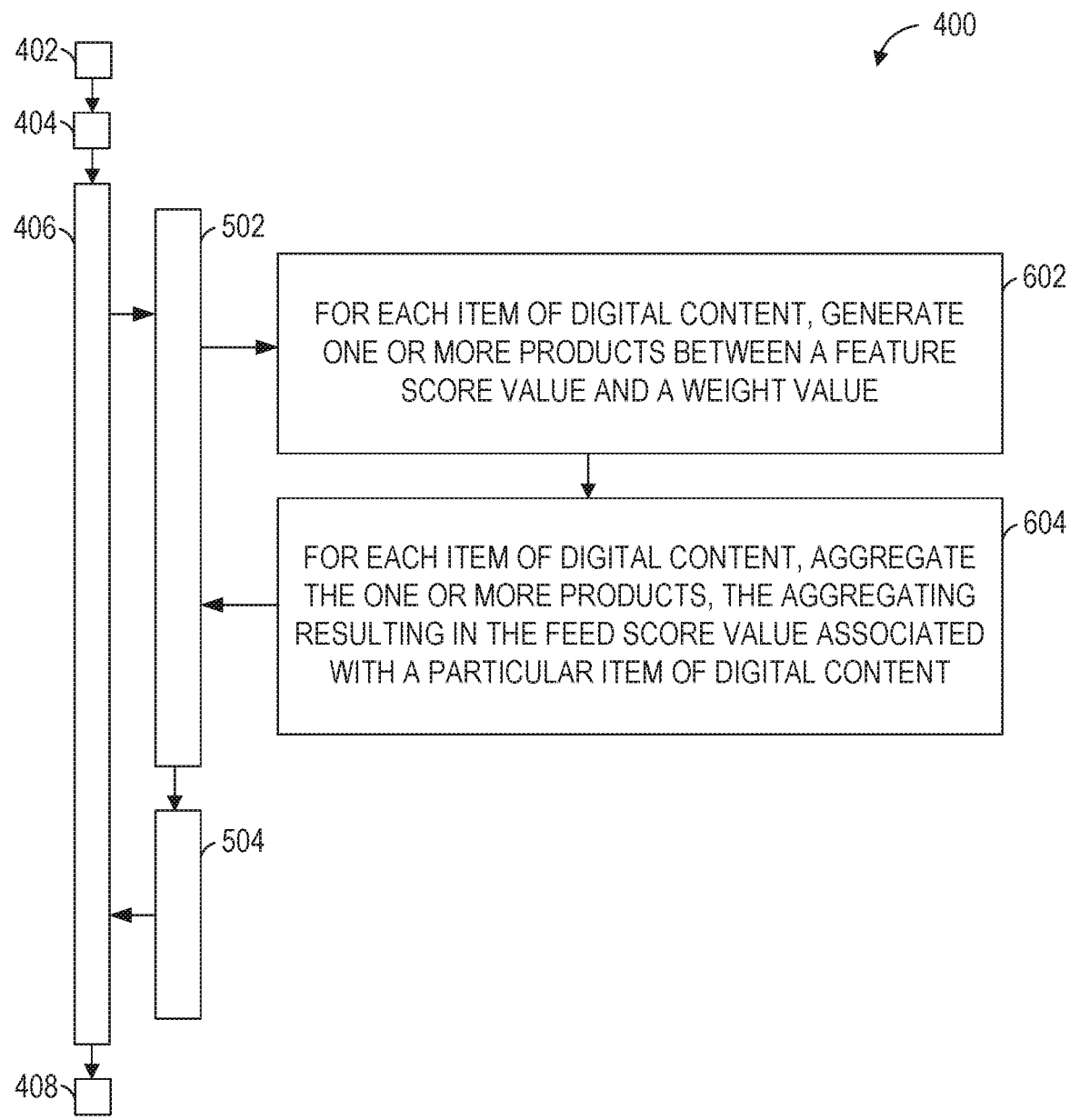
FIG. 6 is a flowchart illustrating a method for generating a digital content feed based on at least explicit feedback from a member of the SNS, and representing step 504 of the method illustrated in FIG. 5 in more detail, according to some example embodiments.

As shown in FIG. 6, the method 400 may include one or more method operations 602 or 604, according to some example embodiments. In some example embodiments, the feature data accessed by the access module 204 includes one or more feature score values.

In some example embodiments, for a feature of an item of digital content, a feature score value is equal to "1" if the particular feature is present, and is equal to "0" if the particular feature is not present. For example, the feature is "Whether the item of digital content has been generated in the last twenty-four hours." If the item of digital content is no older than twenty-four hours, the feature score value is equal to "1." Otherwise, it is equal to "0."

In some example embodiments, for a feature associated with a member of the SNS who is the source of an update, a feature score value is equal to "1" if the particular feature is present, and is equal to "0" if the particular feature is not present. For example, the feature is "Whether the target member is a connection of the source member." If the target member is a connection of the source member, the feature score value is equal to "1." Otherwise, it is equal to "0."

Operation 602 may be performed as part (e.g., a precursor task, a subroutine, or a portion) of operation 502 of FIG. 5, in which the feed generation module 206 generates a ranked list of the items of digital content for the particular member based on the feed score values associated with the one or more items. At operation 602, the feed generation module 206, for each item of digital content, generates one or more products between a feature score value and a weight value. The weight value identifies a preference level for a particular type of digital content. The preference level is derived automatically based on the explicit input data.

Operation 604 may be performed after operation 602. At operation 604, the feed generation module 206, for each item of digital content, aggregates the one or more products. The aggregating results in the feed score value associated with a particular item of digital content.

Figure 7:
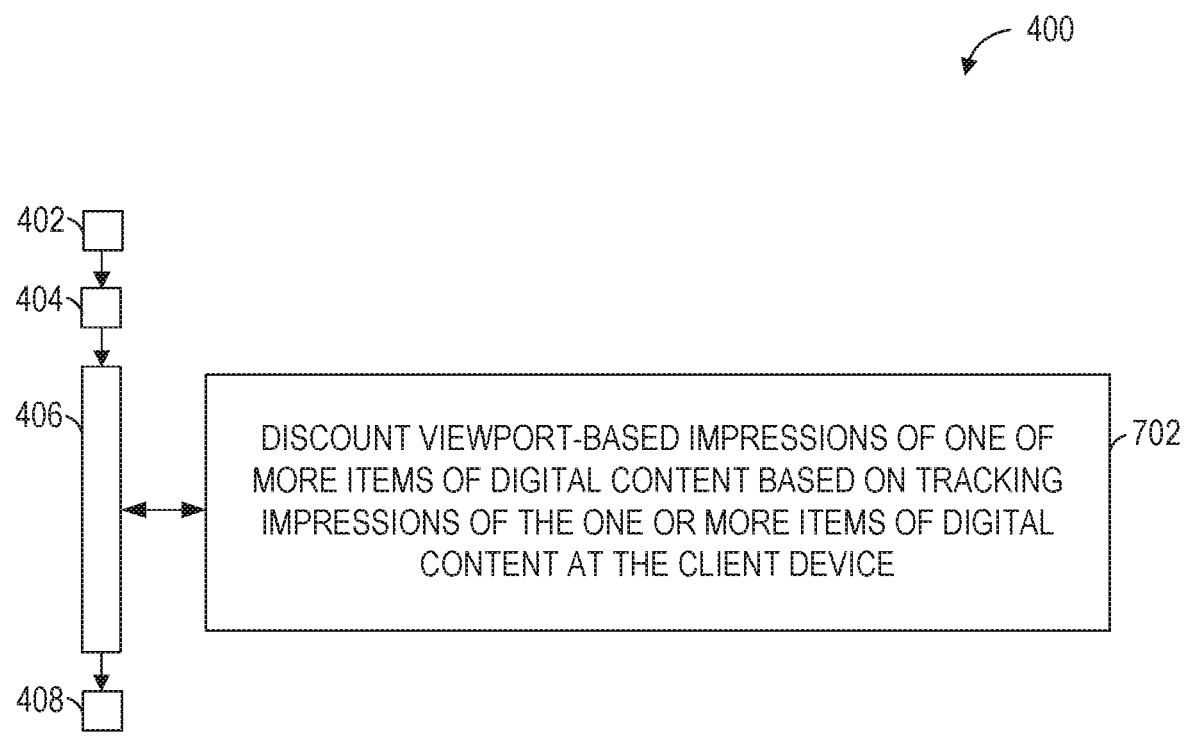
FIG. 7 is a flowchart illustrating a method for generating a digital content feed based on at least explicit feedback from a member of the SNS, and representing step 406 of the method illustrated in FIG. 4 in more detail, according to some example embodiments.

As shown in FIG. 7, the method 400 may include operation 702, according to some example embodiments. Operation 702 may be performed as part (e.g., a precursor task, a subroutine, or a portion) of operation 406 of FIG. 4, in which the feed generation module 206 generates a feed of items of digital content for the particular member based on the explicit input data and the feature data.

At operation 702, the feed generation module 206 discounts viewport-based impressions of one of more items of digital content based on tracking impressions of the one or more items of digital content at the client device. In some example embodiments, the discounting of the viewport-based impressions includes: determining that a particular item of digital content is shared to the SNS by a plurality of members of the SNS, and determining an object identifier associated with the particular item of digital content. The discounting of the viewport-based impressions is further based on the object identifier associated with the particular item of digital content.

Figure 8:
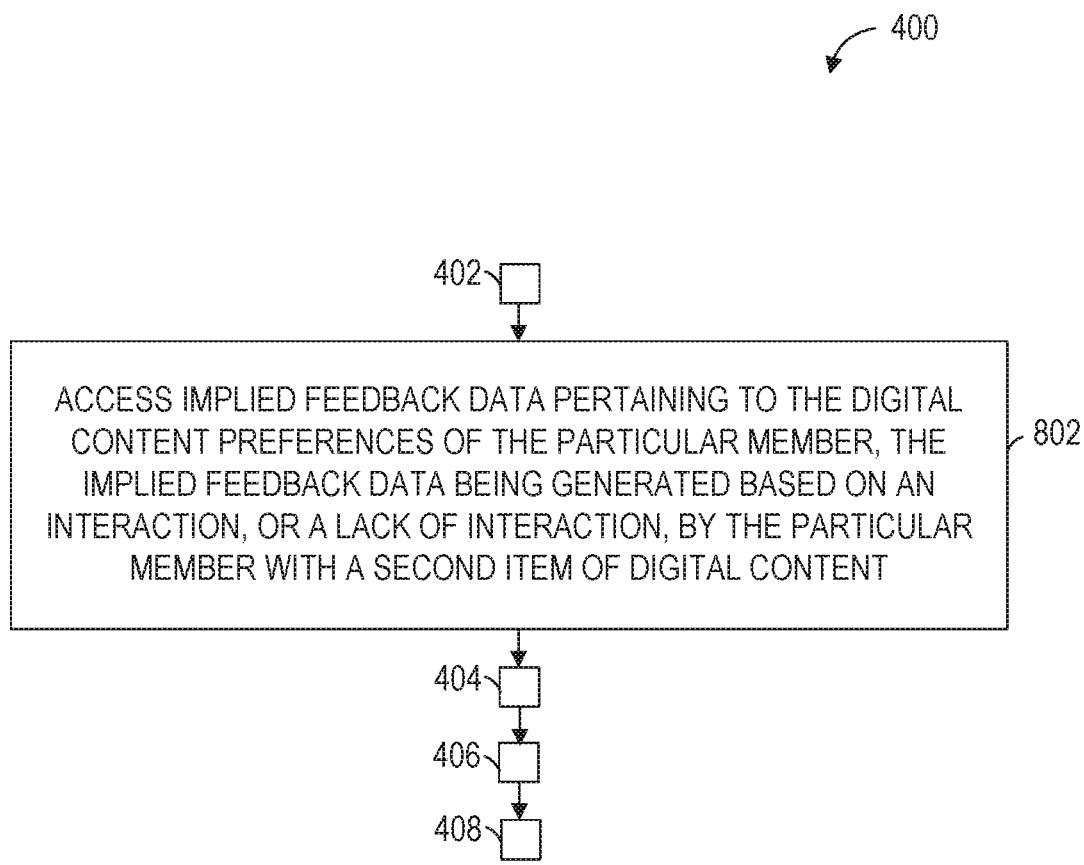
FIG. 8 is a flowchart illustrating a method for generating a digital content feed based on at least explicit feedback from a member of the SNS, and representing an additional step of the method illustrated in FIG. 4, according to some example embodiments.

As shown in FIG. 8, the method 400 may include operation 802, according to some example embodiments. Operation 802 may be performed after operation 402 of FIG. 4, in which the explicit input generation module 202 generates explicit input data describing digital content preferences of a particular member of the SNS. At operation 802, the access module 204 accesses implied feedback data pertaining to the digital content preferences of the particular member. The implied feedback data is generated based on an interaction by the particular member with a first item of digital content, or a lack of interaction by the particular member with a second item of digital content. The generating of the feed of items of digital content for the particular member is further based on the implied feedback data.

In some example embodiments, the implied feedback data includes data pertaining to one or more viral action clicks associated with digital content previously displayed to the particular member.

Figure 9:
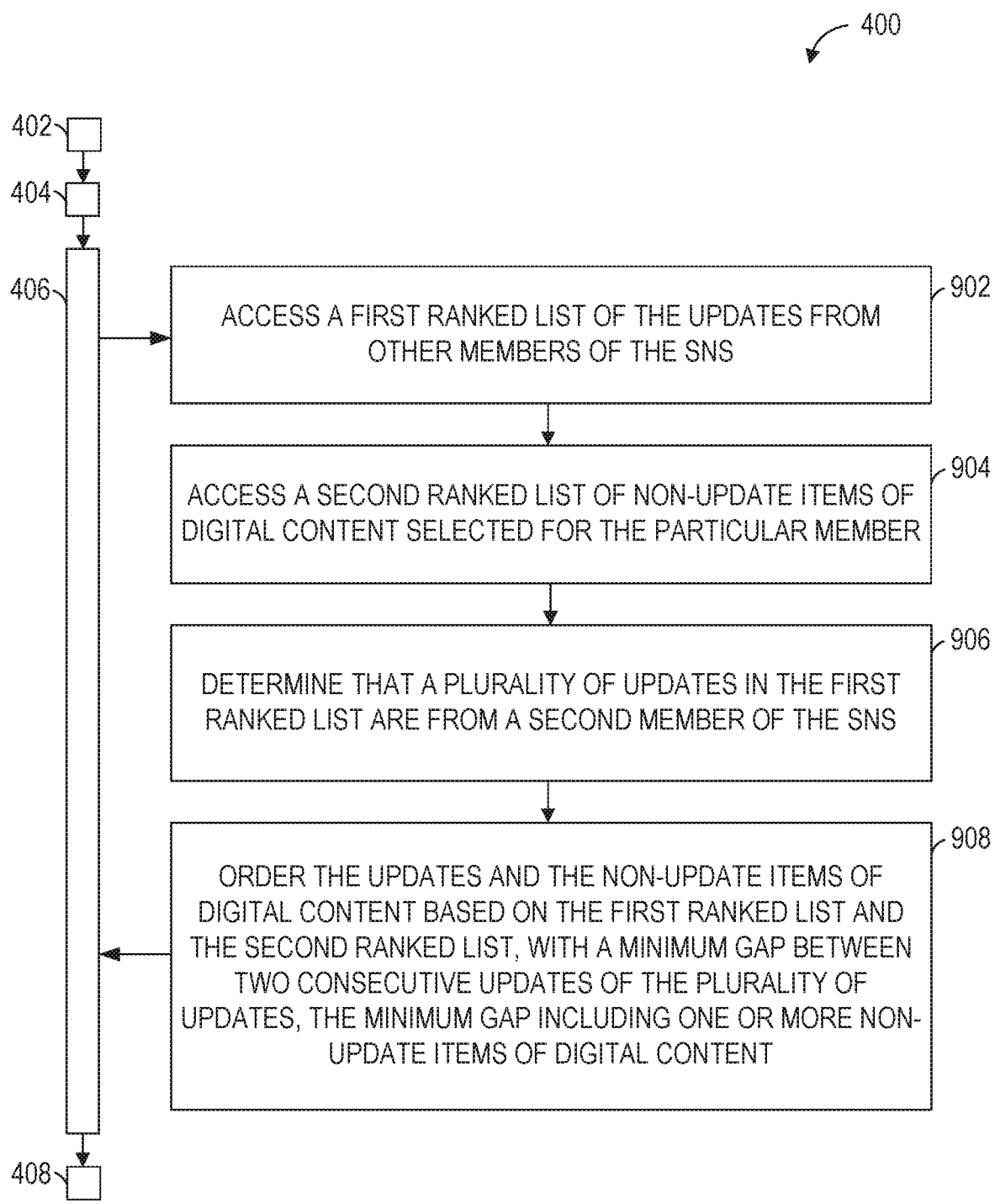
FIG. 9 is a flowchart illustrating a method for generating a digital content feed based on at least explicit feedback from a member of the SNS, and representing step 406 of the method illustrated in FIG. 4 in more detail, according to some example embodiments.

As shown in FIG. 9, the method 400 may include one or more of the method operations 902, 904, 906, or 908, according to some example embodiments. In some example embodiments, the particular member is a first member of the SNS, and the items of digital content include updates from other members of the SNS.

Operation 902 may be performed as part (e.g., a precursor task, a subroutine, or a portion) of operation 406 of FIG. 4, in which the feed generation module 206 generates a feed of items of digital content for the particular member based on the explicit input data and the feature data. At operation 902, the feed generation module 206 accesses a first ranked list of the updates from other members of the SNS.

At operation 904, the feed generation module 206 accesses a second ranked list of non-update items of digital content selected for the particular member.

At operation 906, the feed generation module 206 determines that a plurality of updates in the first ranked list of the updates are from a second member of the SNS. In some instances, an update is from the second member if the second member generated the update. In some instances, an update is from the second member if the second member transmitted (e.g., shared) the update from a client device associated with the second member.

At operation 908, the feed generation module 206 orders the updates and the non-update items of digital content based on the first ranked list and the second ranked list, with a minimum gap between two consecutive updates of the plurality of updates. In some example embodiments, the minimum gap includes one or more non-update items of digital content. In some example embodiments, the minimum gap includes one or more items from a third member.

In some example embodiments, the items of digital content include update items (e.g., shares) from other members of the SNS, and the feed includes a minimum gap between two consecutive update items of a particular type. In various example embodiments, the minimum gap includes one or more update items of a further type. In certain example embodiments, the minimum gap includes one or more non-update items of digital content (e.g., an advertising).

EXAMPLE MOBILE DEVICE

Figure 10:
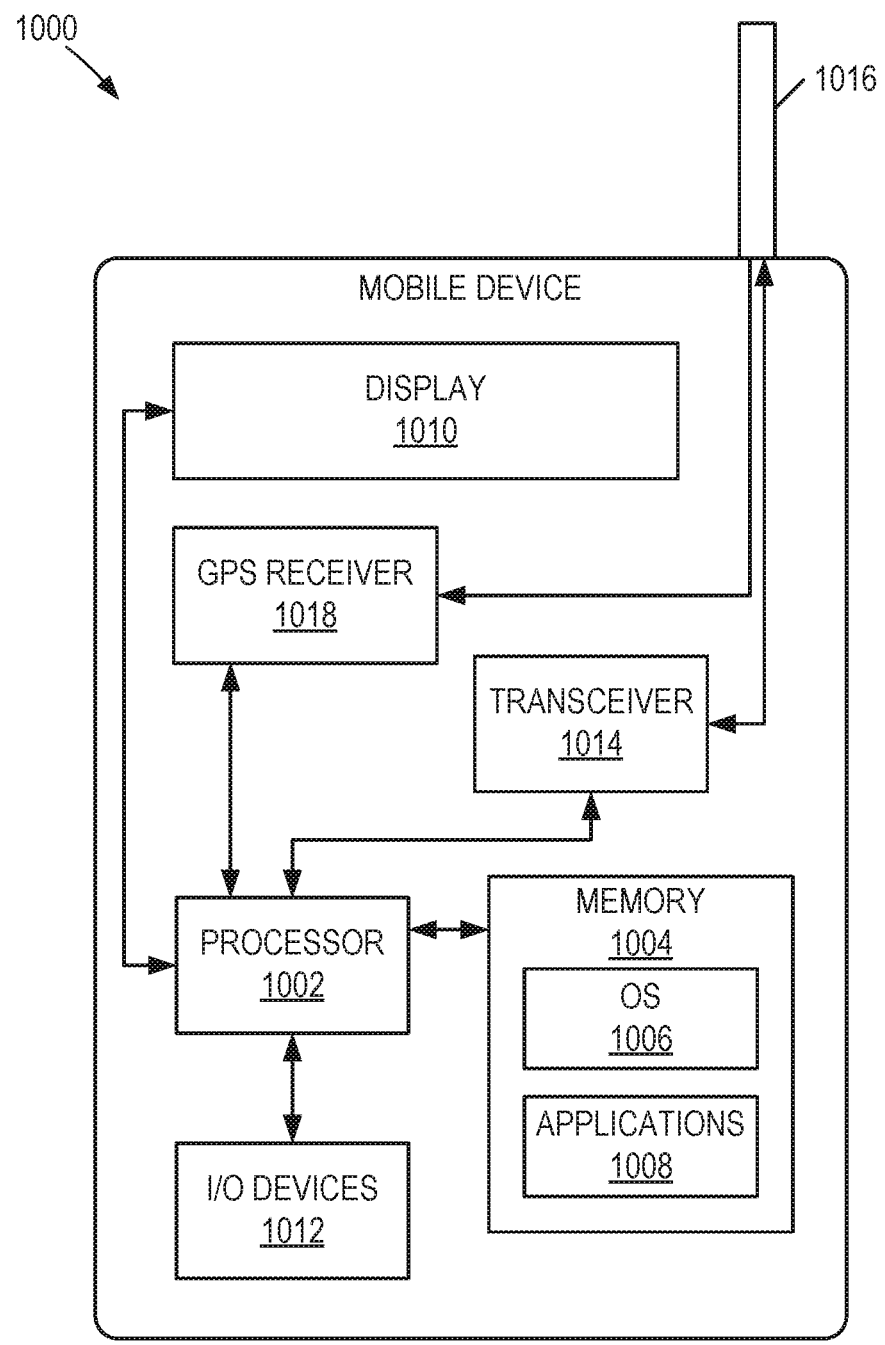
FIG. 10 is a block diagram illustrating a mobile device, according to some example embodiments.

FIG. 10 is a block diagram illustrating a mobile device 1000, according to an example embodiment. The mobile device 1000 may include a processor 1002. The processor 1002 may be any of a variety of different types of commercially available processors 1002 suitable for mobile devices 1000 (for example, an XScale architecture microprocessor, a microprocessor without interlocked pipeline stages (MIPS) architecture processor, or another type of processor 1002). A memory 1004, such as a random access memory (RAM), a flash memory, or other type of memory, is typically accessible to the processor 1002. The memory 1004 may be adapted to store an operating system (OS) 1006, as well as application programs 1008, such as a mobile location enabled application that may provide LBSs to a user. The processor 1002 may be coupled, either directly or via appropriate intermediary hardware, to a display 1010 and to one or more input/output (I/O) devices 1012, such as a keypad, a touch panel sensor, a microphone, and the like. Similarly, in some embodiments, the processor 1002 may be coupled to a transceiver 1014 that interfaces with an antenna 1016. The transceiver 1014 may be configured to both transmit and receive cellular network signals, wireless data signals, or other types of signals via the antenna 1016, depending on the nature of the mobile device 1000. Further, in some configurations, a GPS receiver 1018 may also make use of the antenna 1016 to receive GPS signals.

MODULES, COMPONENTS AND LOGIC

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

ELECTRONIC APPARATUS AND SYSTEM

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

EXAMPLE MACHINE ARCHITECTURE AND MACHINE-READABLE MEDIUM

Figure 11:
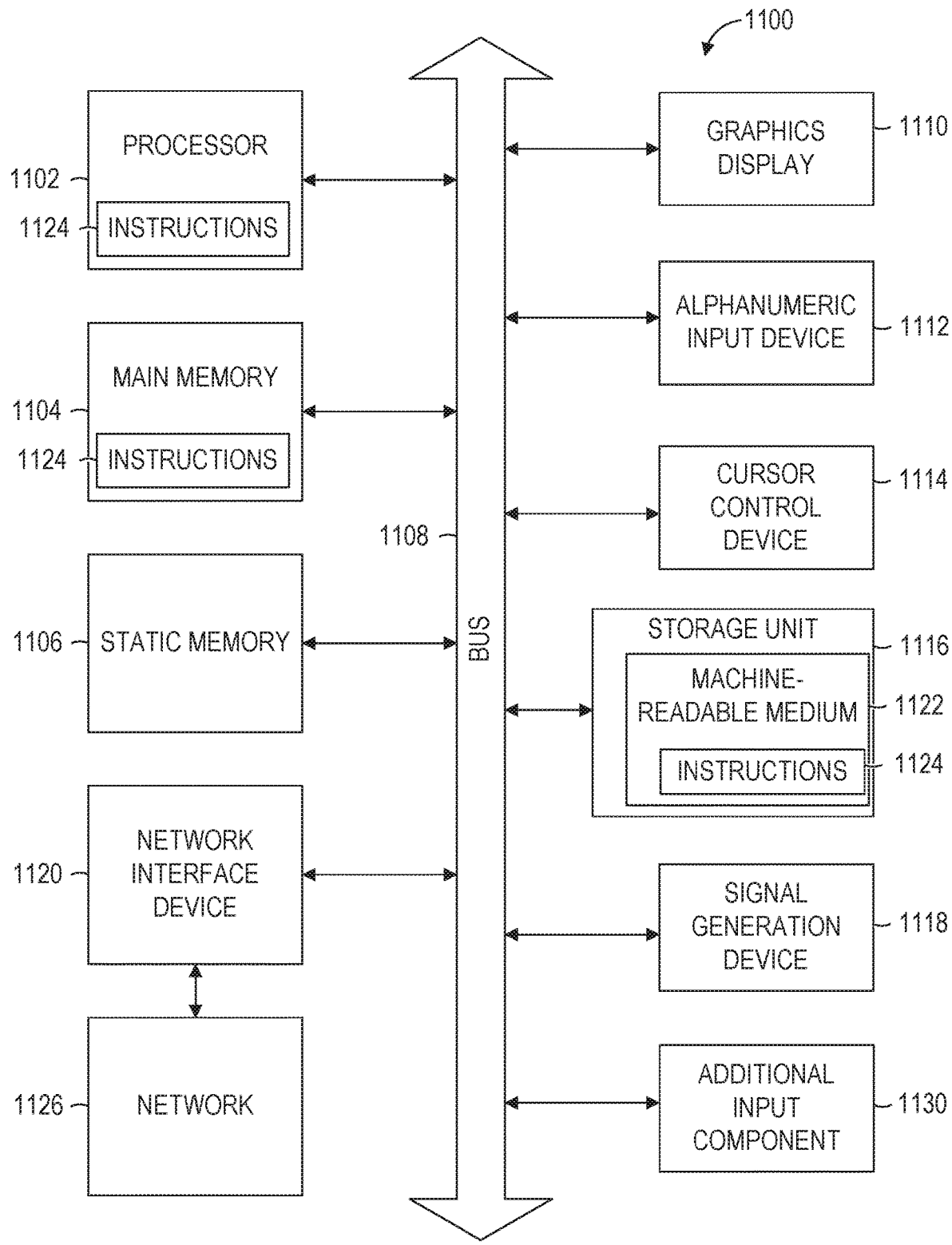
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 1126 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    generating explicit input data describing digital content preferences of a particular member of a social networking service (SNS) based on a communication including explicit feedback data, the communication being received from a client device associated with the particular member;
    accessing feature data pertaining to one or more items of digital content determined to be relevant to the particular member, the feature data describing one or more characteristics associated with the one or more items;
    generating, using one or more hardware processors and a two-stage process, a feed of items of digital content for the particular member based on the explicit input data and the feature data, the generating at a first stage of the two-stage process including ranking, using one or more first-pass rankers for a plurality of types of items of digital content, a plurality of items of digital content of the plurality of types, the ranking by the one or more first-pass rankers resulting in a plurality of ranked item lists of the plurality of types, the generating at a second stage of the two-stage process including aggregating, by a second-pass ranker, the feed of items of digital content using a subset of items of digital content included in the plurality of ranked item lists that are a result of the ranking by the one or more first-pass rankers; and
    causing presentation of the feed of items of digital content in a user interface of the client device associated with the particular user, the causing presentation of the feed of items including causing display of one or more user interface elements for receiving explicit input data pertaining to one or more items of digital content included in the feed, a receiving of explicit input data via the one or more user interface elements causing the one or more first-pass rankers to perform a first ranking of items of digital content of the plurality of types of items of digital content based on the explicit input data received via the one or more user interface elements.

2. The method of claim 1, wherein the generating of the feed of items of digital content for the particular member includes:
determining a feed score value for each of the one or more items of digital content based on the explicit input data and the feature data;
generating a ranked list of the items of digital content for the particular member based on the feed score values associated with the one or more items, and wherein
the generating of the feed of items of digital content for the particular member is further based on the ranked list of the items of digital content for the particular member.

3. The method of claim 2, wherein the feature data includes one or more feature score values, and wherein the determining of the feed score value includes:
for each item of digital content, generating one or more products between a feature score value and a weight value, the weight value identifying a preference level for a particular type of digital content, the preference level being derived automatically based on the explicit input data; and
for each item of digital content, aggregating the one or more products, the aggregating resulting in the feed score value associated with a particular item of digital content.

4. The method of claim 2, wherein the feed score value associated with a particular item of digital content is a probability value that indicates a likelihood that the particular member selects the particular item of digital content.

5. The method of claim 1, wherein the generating of the feed includes:
discounting viewport-based impressions of one or more items of digital content based on tracking impressions of the one or more items of digital content at the client device, an impression being an instance of presenting an item of digital content at the client device.

6. The method of claim 5, wherein the discounting of the viewport-based impressions includes:
determining that a particular item of digital content is shared to the SNS by a plurality of members of the SNS; and
determining an object identifier associated with the particular item of digital content,
wherein the discounting of the viewport-based impressions is further based on the object identifier associated with the particular item of digital content.

7. The method of claim 1, further comprising:
accessing implied feedback data pertaining to the digital content preferences of the particular member, the implied feedback data being generated based on an interaction by the particular member with a first item of digital content, or a lack of interaction by the particular member with a second item of digital content, and
wherein the generating of the feed of items of digital content for the particular member is further based on the implied feedback data.

8. The method of claim 7, wherein the implied feedback data includes data pertaining to one or more viral action clicks associated with digital content previously displayed to the particular member.

9. The method of claim 1, wherein the explicit input data describing digital content preferences of the particular member includes data pertaining to one or more online actions by the particular member at a member onboarding time.

10. The method of claim 1, wherein the explicit input data describing digital content preferences of the particular member includes data pertaining to one or more online actions by the particular member towards digital content previously displayed to the particular member, the one or more actions indicating an intent by the particular member to curate the feed generated for the particular member.

11. The method of claim 1, wherein an item of digital content includes an informational update pertaining to one or more other members of the SNS.

12. The method of claim 1, wherein the particular member is a first member of the SNS, wherein the items of digital content include updates from other members of the SNS, and wherein the generating of the feed of items of digital content for the particular member includes:
accessing a first ranked list of the updates from other members of the SNS;
accessing a second ranked list of non-update items of digital content selected for the particular member;
determining that a plurality of updates in the first ranked list of the updates are from a second member of the SNS; and
ordering the updates and the non-update items of digital content based on the first ranked list and the second ranked list, with a minimum gap between two consecutive updates of the plurality of updates, the minimum gap including one or more non-update items of digital content.

13. The method of claim 1, wherein the items of digital content include update items from other members of the SNS, and wherein the feed includes a minimum gap between two consecutive update items of a particular type.

14. The method of claim 13, wherein the minimum gap includes one or more update items of a further type.

15. The method of claim 13, wherein the minimum gap includes one or more non-update items of digital content.

16. The method of claim 1, wherein the explicit input data includes member preference of one or more types of digital content.

17. A system comprising:
one or more hardware processors; and
a machine-readable medium for storing instructions that, when executed by the one or more hardware processors, cause the one or more hardware processors to perform operations comprising:
generating explicit input data describing digital content preferences of a particular member of a social networking service (SNS) based on a communication including explicit feedback data, the communication being received from a client device associated with the particular member;
accessing feature data pertaining to one or more items of digital content determined to be relevant to the particular member, the feature data describing one or more characteristics associated with the one or more items;
generating, using a two-stage process, a feed of items of digital content for the particular member based on the explicit input data and the feature data, the generating at a first stage of the two-stage process including ranking, using one or more first-pass rankers for a plurality of types of items of digital content, a plurality of items of digital content of the plurality of types, the ranking by the one or more first-pass rankers resulting in a plurality of ranked item lists of the plurality of types, the generating at a second stage of the two-stage process including aggregating, by a second-pass ranker, the feed of items of digital content using a subset of items of digital content included in the plurality of ranked item lists that are a result of the ranking by the one or more first-pass rankers; and causing presentation of the feed of items of digital content in a user interface of the client device associated with the particular user, the causing presentation of the feed of items including causing display of one or more user interface elements for receiving explicit input data pertaining to one or more items of digital content included in the feed, a receiving of explicit input data via the one or more user interface elements causing the one or more first-pass rankers to perform a first ranking of items of digital content of the plurality of types of items of digital content based on the explicit input data received via the one or more user interface elements.

18. The system of claim 17, wherein the generating of the feed of items of digital content for the particular member includes:

determining a feed score value for each of the one or more items of digital content based on the explicit input data and the feature data;

generating a ranked list of the items of digital content for the particular member based on the feed score values associated with the one or more items, and wherein the generating of the feed of items of digital content for the particular member is further based on the ranked list of the items of digital content for the particular member.

19. The system of claim 18, wherein the feature data includes one or more feature score values, and wherein the determining of the feed score value includes:

for each item of digital content, generating one or more products between a feature score value and a weight value, the weight value identifying a preference level for a particular type of digital content, the preference level being derived automatically based on the explicit input data; and for each item of digital content, aggregating the one or more products, the aggregating resulting in the feed score value associated with a particular item of digital content.

20. A non-transitory machine-readable storage medium comprising instructions that, when executed by one or more hardware processors of a machine, cause the one or more hardware processors to perform operations comprising:

generating explicit input data describing digital content preferences of a particular member of a social networking service (SNS) based on a communication including explicit feedback data, the communication being received from a client device associated with the particular member;

accessing feature data pertaining to one or more items of digital content determined to be relevant to the particular member, the feature data describing one or more characteristics associated with the one or more items;

generating, using a two-stage process, a feed of items of digital content for the particular member based on the explicit input data and the feature data, the generating at a first stage of the two-stage process including ranking, using one or more first-pass rankers for a plurality of types of items of digital content, a plurality of items of digital content of the plurality of types, the ranking by the one or more first-pass rankers resulting in a plurality of ranked item lists of the plurality of types, the generating at a second stage of the two-stage process including aggregating, by a second-pass ranker, the feed of items of digital content using a subset of items of digital content included in the plurality of ranked item lists that are a result of the ranking by the one or more first-pass rankers; and causing presentation of the feed of items of digital content in a user interface of the client device associated with the particular user, the causing presentation of the feed of items including causing display of one or more user interface elements for receiving explicit input data pertaining to one or more items of digital content included in the feed, a receiving of explicit input data via the one or more user interface elements causing the one or more first-pass rankers to perform a first ranking of items of digital content of the plurality of types of items of digital content based on the explicit input data received via the one or more user interface elements.

* * * * *